United States Patent
Simon et al.

(10) Patent No.: US 10,860,678 B2
(45) Date of Patent: Dec. 8, 2020

(54) INFORMATION EXTRACTION FROM DATA

(71) Applicant: Signals Analytics Ltd., Netanya (IL)

(72) Inventors: Saul Simon, Hertzelia (IL); Tomer Barkai, Kfar Saba (IL)

(73) Assignee: SIGNALS ANALYTICS LTD., Netanya (IL)

( * ) Notice: Subject to any disclaimer, the term of this patent is extended or adjusted under 35 U.S.C. 154(b) by 0 days.

(21) Appl. No.: 16/203,622

(22) Filed: Nov. 29, 2018

(65) Prior Publication Data

US 2020/0175091 A1   Jun. 4, 2020

(51) Int. Cl.
   G06F 16/958    (2019.01)
   G06F 16/9038   (2019.01)
   G06F 16/903    (2019.01)
   G06F 16/901    (2019.01)

(52) U.S. Cl.
   CPC ........ *G06F 16/986* (2019.01); *G06F 16/9024* (2019.01); *G06F 16/9038* (2019.01); *G06F 16/90335* (2019.01)

(58) Field of Classification Search
   CPC .............................. G06F 16/2465; G06F 16/25
   See application file for complete search history.

(56) References Cited

U.S. PATENT DOCUMENTS

| | | |
|---|---|---|
| 7,194,483 B1 | 3/2007 | Mohan et al. |
| 7,257,530 B2 | 8/2007 | Yin |
| 7,999,809 B2 | 8/2011 | Beers et al. |
| 2003/0144868 A1 | 7/2003 | MacIntyre et al. |
| 2004/0243593 A1* | 12/2004 | Stolte ............... G06F 17/246 |
| 2004/0260534 A1 | 12/2004 | Pak et al. |
| 2006/0031187 A1 | 2/2006 | Pyrce et al. |
| 2011/0264649 A1 | 10/2011 | Hsiao et al. |
| 2015/0186529 A1* | 7/2015 | Rope ............... G06Q 10/00 707/722 |

OTHER PUBLICATIONS

Everything You Need to Know About Semantic Search and What It Means for Your Website, Jul. 14, 2017, https://www.crazyegg.com/blog/everything-about-semantic-search/ (Year: 2017).*

* cited by examiner

*Primary Examiner* — Hau H Hoang
(74) *Attorney, Agent, or Firm* — Naomi S. Rosenman-Helfand

(57) ABSTRACT

A method, apparatus, and computer program product, the method comprising: receiving a description of outputs for obtained information, the description including type for the output, two or more dimensions associated with the outputs, the description selected from a library; receiving a taxonomy, including concepts to be searched for within data, wherein at least one concept constitutes a value for a dimension, the taxonomy selected from the metadata library; receiving processing procedures for data processing; receiving an indication of a data source; receiving content scope, associated with the data source or taxonomy; obtaining items from the data source complying with the content scope; processing the items according to the processing procedures, said processing performed in accordance with the description of the outputs and in accordance with the taxonomy, to obtain relevant information from the items; and transforming the relevant information into output, in accordance with the output description.

24 Claims, 14 Drawing Sheets

Summary

F&BPortfolioTest1.2 / 1a
2017-12-07

Modules and QMs that will be included:

Brand Health
   Brand health assessment
   Brand Buzz and Perception for brand health (S)
   Brand in consumer discussions (S)
   Brand satisfaction in consumer discussions (S)
   Brand website traffic (S)
   Brand Google trends (S)
   Brand Associations
   Brand benefit perceptions (S)
   Brand feature perceptions (S)
   Brand associations data (S)
   Product Reviews Analysis
   Product Reviews Analysis data (S)

Consumer Trends
   Consumer trends around features and benefits
   Consumer Discussions over Time (S)
   Customer segmentation strategy (S)
   Discussion Trends
   Discussion Trends Data (S)

Market Trends ~ 900
   Market trends around features and benefits
   Patent trends (S) ~ 600
   Consumer trends (S) ~ 604
   KOL trends (S)
   Competitors event trends (S)
   Innovation trends
   Innovation trends data (S)
   Consumer discussion trends
   Consumer discussion trends data (S)
   Key opinion leaders discussion trends
   Key opinion leaders discussion trends data (S)

Catalogs and KIPs that will be included:

OnlineStatement ~ 908
   Sales ~ 912
   Number of Instagram Followers
   Ingredient (Taxonomy Depth: 1)
   Sentiment
   Company
   Patent Strength ~ 916
      Number of Citations ~ 920
      Family Size ~ 924
      Number of Geographies ~ 928
      Number of Claims ~ 932
   Number of Twitter Followers
   Statement
   KOL
   Highlight
   Event Type
   Website Traffic
   Content
   Use Case
   Data Cycle
   Brand
   Feature
   Number of Facebook Likes
   Rating
   Product

FIG. 9

INFORMATION EXTRACTION FROM DATA

TECHNICAL FIELD

The present disclosure relates to a method and apparatus for obtaining structured or unstructured information from documents and for transforming the information, into analytical data.

BACKGROUND

The current era, sometimes referred to as "The Information Age" is characterized by proliferation of digital information on any subject, in a multiplicity of formats. For example, if a person or an organization wishes to obtain information related to a certain product or product line they are considering to make or market, they may need to review e-commerce information, articles, magazines, news sources, scientific papers, social media online forums or product reviews, patent documents, or any other structured or unstructured document.

The documents may be received from a variety of sources and in particular online sources, in a variety of formats, in Linguistic registers ranging from high level to very low level, from formatted sources to free-style, or the like.

The proliferation of data sources and the vast amounts of available data in a given subject of interest makes it impossible for a human, or even for a large group of humans to obtain useful information, and in particular quantitative answers to specific questions, such as what consumers think about a product or a line of products, for example how content they are, what features are particularly good or bad, what technological trends are evolving in the space of the product, or the like. Further, whether a document is even relevant or not, or what can be deduced from the document may not always be straight-forward, due for example to multiple meaning words, trademarks, or the like.

Additionally, adjusting the output to a required format, and in particular to a plurality of formats, requires a lot of manual labor, due to the plurality and variability of the data sources and the plurality of options for providing the information.

Thus, extracting information in a useful and efficient manner from a variety of sources requires intensive manual labor, including significant efforts invested in data cleansing, classification from unstructured to structured text, whether these are performed manually or coding efforts for achieving the same. There is therefore a need in the art for a system and method for extracting data from a variety of sources, to be processed for generating and outputting analytical data in a variety of manners, without investing coding or other significant efforts.

BRIEF SUMMARY

One exemplary embodiment of the disclosed subject matter is a computer-implemented method for obtaining information from data, executed by a computing platform comprising a memory and a processor, the method comprising: receiving a description of one or more outputs for obtained information, the description including type for the output, two or more dimensions associated with the outputs, the description selected from a metadata library; receiving a taxonomy, including concepts to be searched for within data, wherein one or more of the concepts constitutes a value for one or more dimensions from the two or more dimensions, the taxonomy selected from the metadata library; receiving processing procedures for data processing; receiving an indication of a data source; receiving content scope, associated with the data source or the taxonomy; obtaining data items from the data source complying with the content scope; processing by the processor the data items according to the processing procedures, said processing performed in accordance with the description of the outputs and in accordance with the taxonomy, to obtain relevant information from the data items; and transforming by the processor the relevant information into output, in accordance with the description of the outputs. The method can further comprise receiving a definition of how to obtain the information from data in context of output presentation, including access instructions to one or more data sources and mapping of source fields to the dimensions. Within the method, the description optionally comprises associations between each of the dimensions and a respective role. Within the method, the role is optionally an axis of a graph or a filter. Within the method, the description and the taxonomy are optionally associated with any arbitrary domain. Within the method, at least part of the metadata library is optionally partitioned by domains. Within the method, the metadata library is optionally created or modified by configuring. Within the method, the description, the taxonomy and the processing procedures are optionally selected by configuration. Within the method, the processing optionally comprises semantic analysis of the data items. Within the method, the processing and the transforming optionally do not require programming for processing for a particular domain.

Another exemplary embodiment of the disclosed subject matter is a computerized apparatus having a processor, the processor configured to perform the steps of: receiving a description of one or more outputs for obtained information, the description including type for the output, two or more dimensions associated with the outputs, the description selected from a metadata library; receiving a taxonomy, including concepts to be searched for within data, wherein one or more of the concepts constitutes a value for one or more dimensions from the two or more dimensions, the taxonomy selected from the metadata library; receiving processing procedures for data processing; receiving an indication of a data source; receiving content scope, associated with the data source or the taxonomy; obtaining data items from the data source complying with the content scope; processing by the processor the data items according to the processing procedures, said processing performed in accordance with the description of the outputs and in accordance with the taxonomy, to obtain relevant information from the data items; and transforming by the processor the relevant information into output, in accordance with the description of the outputs. The apparatus of claim 10, wherein the processor is further configured to perform receiving a definition of how to obtain the information from data in context of output presentation, including access instructions to at least one data source and mapping of source fields to the at least two dimensions. Within the apparatus, the description optionally comprises associations between each of the at least two dimensions and a respective role. Within the method, the role is optionally an axis of a graph or a filter. Within the apparatus, the description and the taxonomy are optionally associated with any arbitrary domain. Within the apparatus, at least part of the metadata library is optionally partitioned by domains. Within the apparatus, the metadata library is optionally created or modified by configuring. Within the apparatus, the description, the taxonomy and the processing procedures are optionally selected by configuration. Within the apparatus, the processing and the transforming optionally do not require programming for processing for a particular domain. Within the apparatus, the processing optionally comprises semantic analysis of the data items.

Yet another exemplary embodiment of the disclosed subject matter is a computer program product comprising a non-transitory computer readable storage medium retaining program instructions configured to cause a processor to perform actions, which program instructions implement: receiving a description of one or more outputs for obtained information, the description including type for the output, two or more dimensions associated with the outputs, the description selected from a metadata library; receiving a taxonomy, including concepts to be searched for within data, wherein one or more of the concepts constitutes a value for one or more dimensions from the two or more dimensions, the taxonomy selected from the metadata library; receiving processing procedures for data processing; receiving an indication of a data source; receiving content scope, associated with the data source or the taxonomy; obtaining data items from the data source complying with the content scope; processing by the processor the data items according to the processing procedures, said processing performed in accordance with the description of the outputs and in accordance with the taxonomy, to obtain relevant information from the data items; and transforming by the processor the relevant information into output, in accordance with the description of the outputs.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 9 is an exemplary display of a summary of contents participating in a project, in accordance with some embodiments of the disclosure;

DETAILED DESCRIPTION

Figure 1:
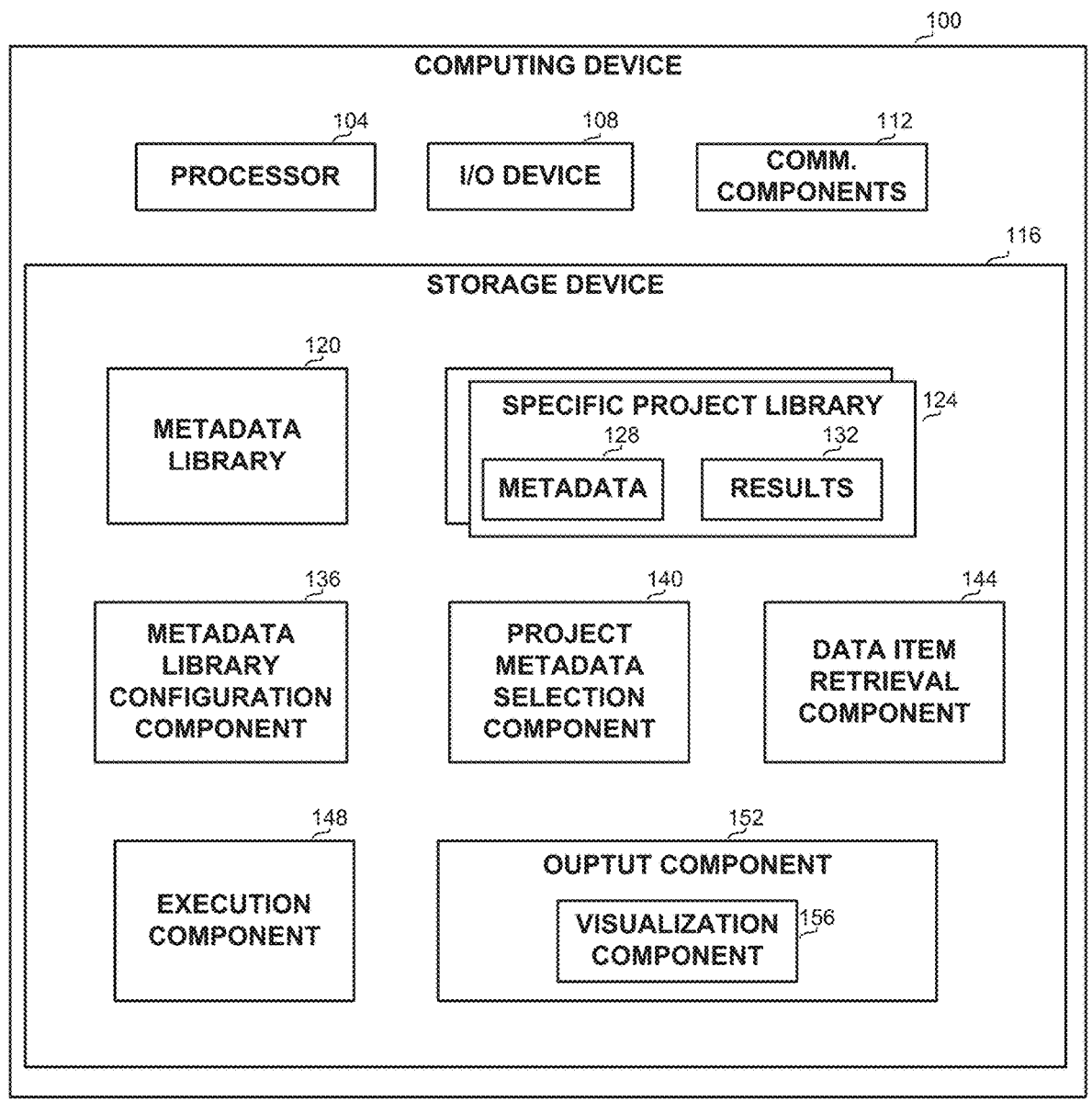
FIG. 1 is a block diagram of an apparatus for extracting information from data, in accordance with some embodiments of the disclosure.

One technical problem dealt with by the disclosed subject matter is the need to analyze large quantities of data from various sources in order to obtain analytical information related to specific questions in a domain category. Thus, the specific data sources, as well as the relevant analysis data and parameters, and the processing which the documents from the data sources are required to undergo, need to be selected according to the specific case.

The term "data" used in this specification should be expansively construed to cover any kind of structured or unstructured document, also related to as "data item", that needs to be processed. The processing results comprise structured data, referred to as "information".

The term "output" used in this specification should be expansively construed to cover any kind of graphical or textual format or visualization of the information. An output may comprise components including but not limited to: catalogs, dimensions, and taxonomies.

The term "dimension" used in this specification should be expansively construed to cover any kind of division or enumeration of a range or a group of terms.

The term "metadata library" used in this specification should be expansively construed to cover any kind of a collection comprising descriptions of output definitions and/or output components whether included in outputs or not.

The term "taxonomy" used in this specification should be expansively construed to cover any kind of organization of words or terms, also referred to as "terms". The organization may be flat, hierarchical, comprise a multiplicity of hierarchies, or any combination thereof. A taxonomy may be associated with a predetermined dimension.

The term "processing procedures" used in this specification should be expansively construed to cover any kind of instructions or guidelines on how the documents or processing results thereof should be processed to obtain the information.

The term "indication" used in this specification should be expansively construed to cover any kind of name, Universal Resource Allocator (URL), ID, or another identifier of an entity.

The term "content scope" used in this specification should be expansively construed to cover any kind of text, formatted query or any other format, which defines a specific list of entities to be analyzed.

The term "model" used in this specification should be expansively construed to cover any kind of output providing information related to a specific question, such as a graph having predetermined axes and predetermined values, a table having specific columns, or the like.

The term "domain" used in this specification should be expansively construed to cover any kind of industry vertical market, or high-level product grouping for example cosmetics, food, drinks, etc.

The term "category" used in this specification should be expansively construed to cover any kind of sub-domain, related to a specific type of products or services, for example hair care, carbonated drinks, or the like.

The term "project" used in this specification should be expansively construed to cover any kind of data and configurations aimed at creating output related to a specific set comprising one or more questions, for example a collection of output definitions, one or more taxonomies, data sources, queries, or the like. A project may thus contain one or more models. A project may relate to a one-time research or to a repetitive research having a life cycle and repeating over time.

The term "catalog" used in this specification should be expansively construed to cover aggregation of content in a certain context, for example a collection of description and metadata, for example products, patent documents or reviews related to a project. For example, for a certain product one catalog may comprise data from social network related to the product wherein the data is arranged in dimensions, another catalog may relate to patent documents related to a product, arranged in accordance with the relevant fields, such as publication number, date, claims, description, or the like. It will be appreciated that catalogs having the same structure can be used in a multiplicity of projects. For example, a patent catalog having the same columns can be applicable to researching different questions.

The questions to be answered by analyzing the data may relate to one or more subjects, within the context of a business category, for example "competing products for controlling diabetes", "new consumer tastes in coffee drinks", "new technology and patents in hair care category", or others. The questions may relate to any aspect of the category, such as "what benefits does product X have in category Y", "what disadvantages does product Y have over competing products", "which side effect does product Z cause", "does product W cause dehydration", or the like, wherein the aspects need to be configurable. Each such question may be classified in accordance with one or more parameters, such as age, gender, geographic location (e.g., city, country, continent), or the like. It may also be required to filter the data, for example showing only the data related to products with certain features or benefits, a certain geographic location, certain set of competitors, or the like.

Another technical problem dealt with by the disclosed subject matter is the need to define the content of the output, e.g., the various filters applied to the data (e.g. only data related to a certain country), the dimensions of the output data and the relevant points (e.g., in a graphic representation, the dimensions may be a plurality of product features vs. geographic regions, wherein the relevant points for the geographic dimension are the continents, and for the product feature dimension the list of features selected for display).

Yet another technical problem dealt with by the disclosed subject matter is the need to provide the format of the output in one or more of a variety of manners, which may include graphic charts, tables, text, applicative data provided via an Application Program Interface (API), or others. The selection between the output manners may be dynamic.

One technical solution comprises the selection of all the definitions required for analyzing data items from a metadata library, related to a project. The metadata library may comprise a plurality of output definitions. Each output definition may be associated with a plurality of catalogs (for example the output may be based on news feed and customer reviews retrieved for a certain product), where each catalog may be associated with one or more dimensions (for example patent summary text, date and author name), and each dimension may contain one or more taxonomy concepts. The metadata library may be associated with available data sources, and may comprise per each data source the processing instructions for obtaining information from the data source. The metadata library may also comprise normalization instructions for each data source. Normalization instructions may relate, for example, to some social network sources in which a hashtag should be ignored, while in others it should not be ignored. Each data source may also be associated with specific mapping instructions, for example where the author, item description or date is to be found. The metadata library may also comprise mapping instructions for mapping the required fields of each data source into a uniform format, such as table columns where each column represents a catalog dimension.

The metadata library may be enriched by adding new library components or enriching existing components such as output definitions, catalogs, dimensions, taxonomies, or the like, thus ensuring continuous improvement of the metadata library for future projects. It will be appreciated that any modification to the metadata library, including addition of a new catalog, adding or enriching taxonomies, adding or changing dimensions, or the like, does not require any programming, rather the dimensions and taxonomy, and optionally also the outputs can be configured using only a metadata component based user interface.

When it is required to analyze data items in order to answer one or more specific questions, the required output metadata may be selected from the metadata library in accordance with the specific question. Thus, a user may select specific output defining how the analysis results are to be provided, the various dimensions for display on graph axis and filters, the relevant taxonomy associated with the selected dimensions, the required data sources and associated configurations, and processing instructions thereof, and possibly additional parameters.

Relevant data items, such as relevant documents, may then be obtained, for example in response to a relevant query applied against an external data repository (for example, patent database, product reviews or news feeds) that is in accordance with the scope of the output. The obtained source data items may then be processed using the processing instructions, including analysis in accordance with the required dimensions and taxonomy. The output may then be transformed to the required format.

Another technical solution of the disclosure relates to the processing instructions being carried out sequentially and automatically by the processor, while allowing the user to review interim output resulting from certain steps of the automation for the purpose of examining the quality of intermediate results.

One technical effect of the disclosure relates to providing a fast and efficient method and apparatus for obtaining information from structured or unstructured data. The information may be obtained using configuration only, without any coding.

Another technical effect relates to the coupling and interrelations between the output format and the performed analysis. The definitions provided by the user are used for analyzing the data as well as for creating the output, thus creating this coupling. For example, the user may select dimensions to be used by the output, and taxonomy concepts for each dimension. The concepts may be used as the set of values for at least one of the dimensions. For example, if the required output describes products vs. countries, various countries may be selected from the taxonomy to be used as values in the countries axis (whether the output is graphic or not).

Yet another technical effect relates to the option to extract information related to any domain, or category, without any coding or addition of components, by selecting components from an existing project in the metadata library plus the entire or partial dataset of the same project.

Referring now to FIG. 1 showing a block diagram of an apparatus for extracting information from data.

The apparatus may comprise computing device 100. It will be appreciated that computing device 100 can comprise one or more computing devices, which may be co-located or located in different sites and communicating therebetween. Computing device 100 may comprise one or more processors 104. Any of processors 104 may be a Central Processing Unit (CPU), a microprocessor, an electronic circuit, an Integrated Circuit (IC) or the like. Alternatively, processor 104 can be implemented as one or more firmwares written for or ported to a specific processor such as digital signal processor (DSP) or microcontrollers, or can be implemented as hardware or configurable hardware such as field programmable gate array (FPGA) or application specific integrated circuit (ASIC). Processors 104 may be utilized to perform computations required by computing device 100 or any of its subcomponents.

In some embodiments, computing device 100 may comprise an input-output (I/O) device 108 such as a terminal, a display, a keyboard, a mouse, a touch screen, or the like, to interact with the system, for example to invoke the system, configure the system, receive results, or the like.

In some embodiments, computing device 100 may comprise one or more communication components 112, for communicating with other computing platforms, databases, the Internet, or the like. Communication components 112 can be used for interfacing with any communication channel using any communication protocol. Communication components 112 can be used for importing data, receiving data items, exporting results, or the like.

Computing device 100 may comprise one or more storage devices 116 for storing executable components, and which may also contain data during execution of one or more components. Storage device 116 may be persistent or volatile. For example, storage device 116 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 116 may retain data structures and program code operative to cause any of processors 104 to perform acts associated with any of the steps shown in FIG. 3 or 4 below.

Storage device 116 can store, or be operatively connected to another storage device storing models, taxonomies, queries, or other parts of one or more models provided or configured by a user, raw data items, intermediate or final processing results, or the like.

Storage device 116 can comprise metadata library 120 detailed in association with FIG. 2A below, and specific project library 124. Specific project library 124 can comprise specific metadata 128 detailed in association with FIG. 2B below, and results 132.

Figure 2A:
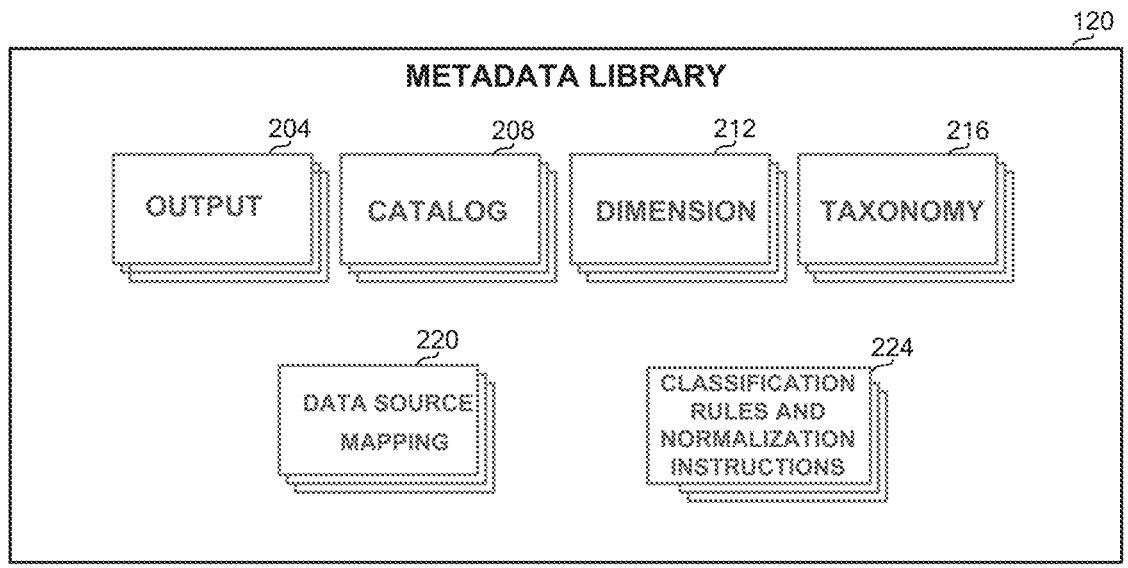
FIG. 2A is a schematic block diagram of the contents of a metadata library, in accordance with some embodiments of the disclosure.

Referring now also to FIG. 2A, showing a schematic block diagram of the contents of a metadata library.

Metadata library 120 can comprise definitions to be used by all the system components and for any domain. Thus, a new project, in which it is required to answer one or more questions, can derive metadata from metadata library 120. Metadata added to or modified in the Metadata library becomes available for use by all existing or future projects.

Metadata library 120 can comprise one or more output definitions 204, which may comprise definitions of various output formats, each of which may be adequate for a multiplicity of domains, for example graphs of various types such as histograms, pie charts, line graphs or others, tables, free text, HyperText Markup Language (HTML) or the like. The output definition may also comprise one or more catalogs, each catalog may be associated with one or more dimensions, and each dimension may contain one or more taxonomy concepts.

Metadata library 120 can comprise one or more catalogs 208 listing various catalogs that have been created. Each such catalog may represent a class of data, such as product data, social media posts or reviews, clinical trial details, patent data, etc. Each catalog may be associated with one or more dimensions. The set of catalog dimensions may be associated with a table head comprising an entry (a column head) for each field that may be significant for the output. Each catalog is optionally linked or otherwise associated with one or more outputs from output definitions 204 showing its results, dimensions 212, taxonomy 216, and optionally classification rules 220 or data source mapping 224 detailed below.

Metadata library 120 can comprise one or more dimensions 212 which may relate to various catalogs according to which data can be analyzed, filtered or displayed. Each such dimension may represent an attribute of the catalog, and may be arranged hierarchically. For example, a catalog referred to as "company", may comprise columns and dimensions, that describes companies. Metadata library 120 may also contain an entity dictionary that includes entity names, for example lists of company names, product names, ingredient names, or the like.

Thus, the catalog "company" comprises a schema (e.g. the structure and columns) corresponding to the set of dimensions selected for the catalog. Non-limiting examples of dimensions under catalog "company" may include: brand, into which a list of brands is selected for each project from the brand (company) entity dictionary; date, in any unit of time, from milliseconds to years; and geographic location ranging from a specific address to streets, neighborhoods, cities, countries. Further dimensions can relate to social media catalog; for example, author gender, age or other demographic parameters; occupation; hobbies. Further dimensions relating to catalog product may include but are not limited to product features, benefits of features, product from, solution type, etc.

Metadata library 120 can comprise one or more taxonomies 216. Taxonomy 216 can comprise concepts, e.g. words, phrases, names or other terms to be searched for within data items. A taxonomy may relate to a dimension in the context of one or more categories. A taxonomy may be hierarchical, e.g., arranged by subject hierarchy. Such that each level provides options for the term it is detailing from the higher level. The example below shows a small part of an exemplary hierarchy, wherein each level may comprise more terms additional to the ones being displayed:

Categories: cosmetics; coffee drinks; infant nutrition
Cosmetic catalog: Product, Social, Patents
Catalog Dimensions: benefits; features; packaging types; skin types; treatment areas Benefit taxonomy (level 1): affordable; ease of use; firming; long lasting Long lasting taxonomy (level 2): lasts; no need to reapply; lasts on; lasts forever; lasts long time.

The terms and phrases of the various levels (e.g., "Long lasting; lasts forever;) may indicate the actual terms and combinations to be searched for. It will be appreciated that some phrases may be predicates to be searched for with additional words, for example: need <NOT> reapply, last <ON> skin; etc.

Metadata library 120 can comprise data source mapping 220, comprising for each possible data source how to obtain data from the data source, and how to map the obtained data items into dimensions and catalogs. Some exemplary data sources for which instructions may be provided may include but are not limited to: online posts in one or more social networks; patent documents; scientific papers, news sites, or the like. Since most data sources have known structure, these instructions provide for obtaining a list of possibly relevant data items using the site's own query and organization mechanism, and determining how to access the relevant fields from each data item. For example, in a certain e-commerce site, a source may be defined as the skin care products sold on that site, and a configuration may provide instructions on how to access the search field, add value, send to the server, receive the results and browse through the results. Then, mapping instructions may instruct where to find the manufacturer, ingredients, size, or other details in the received results. In some situations, a field, for example a date, can appear under one name, e.g. "publishing date" in one type of data items and under another name, e.g. "publication date" in data items from a different source. Thus, the mapping instructions are provided for arranging in a uniform manner fields from different sources.

Metadata library 120 can comprise classification rules and normalization instructions 224, instructing how to process data items provided by each possible data source. The normalization instructions can specify specific instructions for each such data source, for example what are the various list delimiters used and how to convert them into a single canonical delimiter. The normalization instructions can also comprise instructions for certain actions, such as identifying and removing duplicate data items, identifying and removing excessively long source data items, identifying and removing irrelevant data items, standardizing date format or the like. The classification rules may indicate how data items are to be classified. For example, when classifying consumer reviews on certain products, the processor, upon scanning unstructured text may apply the classification rules in order to identify specific taxonomy concepts associated with one or more dimensions. For example, in order to classify product benefits such as "reduces dark circles" and "moisturizes", a user can configure processing instructions such as: "{PREDICATE} reduce; {OBJECT} dark circle" and "{PREDICATE} feel; {DESCRIPTOR} moist", which can catch sentences such as:

"It significantly reduced my dark circles"

"Helps reducing the appearance of dark circles"

"It feels cool and moist on the lips."

"This moisturizer left my lips feeling moist" thus identifying product benefits, product features, solution type, product form, brand sentiment or the like.

It will be appreciated that metadata library 120 can be partitioned in accordance with domains, wherein a domain may relate to one or more categories, for example "cosmetics and hair care". The partitions may be arranged such that each output, catalog, dimension, taxonomy, normalization instruction and data source mapping is associated with one or more domains or categories. Thus, if a new domain which is similar to an existing domain is added to a certain metadata library, the associations of the existing domain may be configured to be applied also to the new domain and necessary changes may be introduced, thus creating a new domain in minimal effort.

Figure 2B:
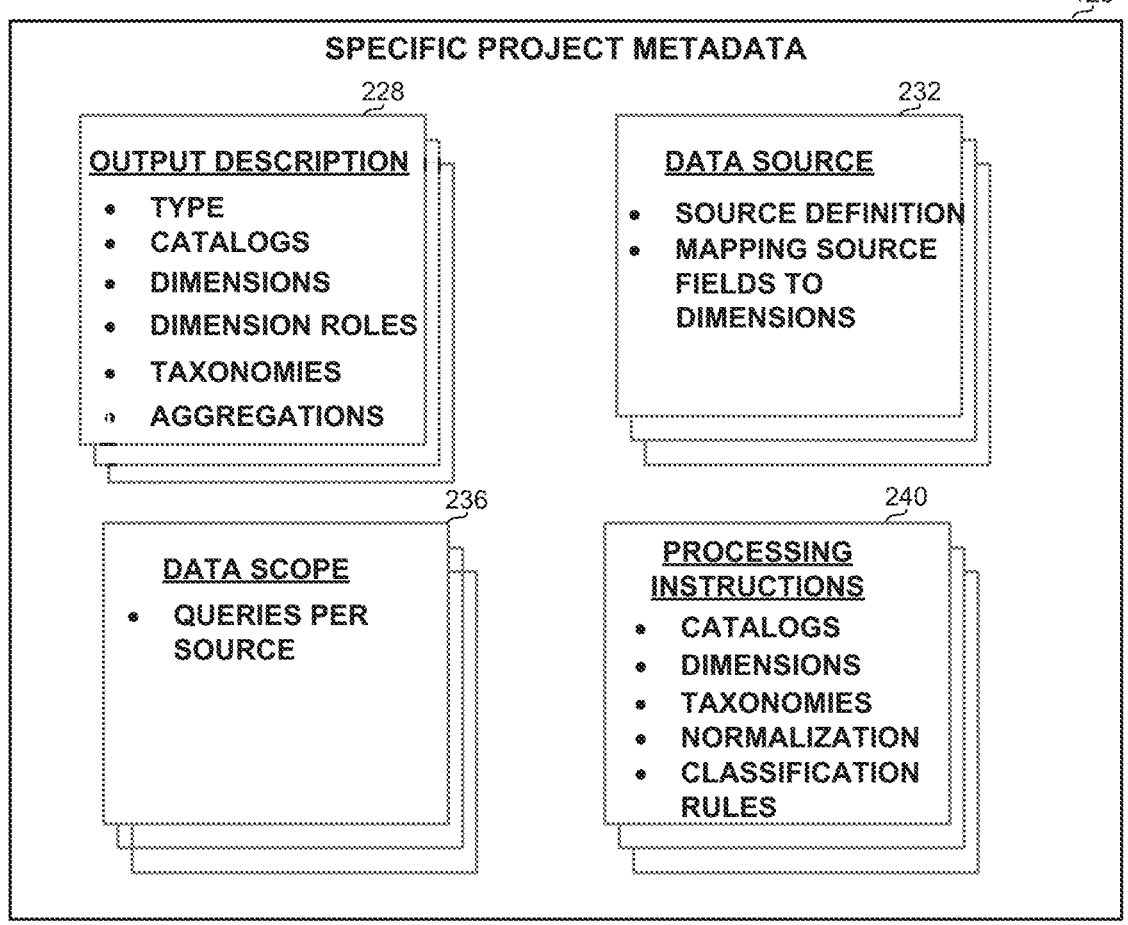
FIG. 2B is a schematic block diagram of the contents of a specific project metadata library, in accordance with some embodiments of the disclosure.

Referring now also to FIG. 2B, showing a schematic block diagram of the contents of a specific project metadata 128.

The contents of specific project metadata 128 may be created upon selection and association of entities from metadata library 120, for example by configuration, by a user interface, or the like.

Specific project metadata 128 can comprise output description 228 representing one or more outputs of the project information as defined in, and selected from outputs 204. Each output description 228 may comprise output type, e.g. a graph of any type; a table, or the like; one or more catalogs from catalogs 208 such as products social media, patents, publications, clinical trials, key-opinion-leaders (KOLs), and more. Each such catalog may be associated with one or more dimensions selected from dimensions 212. For example, the dimensions selected for product catalog may include features, benefits, solution type, product form, product brand, or the like. Each dimension may comprise values from the taxonomy values as detailed below. In some situations, the same taxonomy (for example "feature") can be used in different catalogs, for example in social reviews as well as in products.

Each such dimension may be associated with a role. The role may relate, for example to whether a dimension is used as an axis of a graph, or a filter. In a non-limiting example, assume that for a given set of dimensions including product type, country and quantities, the product type dimension is assigned to the graph axis and the country dimension to the filter. When filtered for a specific country, the graph displays the count of product types for the country, or vice versa. When filtered for a specific product the graph shows the quantities of the product per country. It will be appreciated that filtering and selecting axis and values thereon are interchangeable.

Output description 228 may comprise one or more taxonomies, e.g., one or more concept hierarchies selected from taxonomies 216 and may be relevant to the specific category.

Output description 228 may comprise one or more entity aggregations. Some aggregations may be non-standard, for example the collection of products having a certain feature, or the like. Other aggregations may indicate how entities may be hierarchically related, for example that various districts are aggregated to a certain country, certain products are aggregated into one product type, or the like.

Specific project metadata 128 can comprise data source 232, indicating the data sources defined for the specific project, for example product reviews and Facebook posts. Data source 232 can also indicate for fields of each data source the mapping of data from the source data items into a uniform format. Thus, the table associated with a catalog may be filled with a row per each data item such that the fields of the data item are mapped into the corresponding column entries as defined by data source mapping 224. The collection of all rows provides alignment and uniform structure and data typing for data items from the different data sources.

Specific project metadata 128 can comprise data scope, which indicates for each data source a query, to be used for defining the scope of the data items to be retrieved from the source. The queries may be phrased in free language, for example when retrieving data items from an internet search engine; as SQL for retrieving from an SQL database; as a query phrased or optimized for a particular data source such as a social network, or the like.

Specific project metadata 128 can comprise processing instructions 240 for defining specific processing required within the project for processing various data items. Processing instructions 240 can comprise normalization procedures for normalizing data items, and classification rules to be applied when processing the data items. For example, an instruction to remove irrelevant data items from the collected data can be adapted to each project, classification rules can be adapted to unique aspects of the taxonomy used in a project, etc. The processing instructions are detailed in association with FIG. 4 below Referring now back to FIG. 1, storage device 116 can comprise executable components as detailed below, which may be implemented as one or more sets of interrelated computer instructions, executed for example by any of processors 104 or by another processor. The components may be arranged as one or more executable files, dynamic libraries, static libraries, methods, functions, services, or the like, programmed in any programming language and under any computing environment.

In some exemplary embodiments of the disclosed subject matter, storage device 116 may comprise a metadata library configuration component 136. Metadata library configuration component 136 may comprise user interface to be used by a user for configuring metadata library 120, for example initial configuration of a new output definition, changing output definition entities such as catalogs, dimensions or filters, changing visual aspects such as colors, chart type and the like, changing the output type of an output definition, adding or changing taxonomy concepts, adding or changing processing instructions, adding or changing sources and queries or the like. Additionally, or alternatively, metadata library configuration component 136 may be configured to receive changes to an existing library from a remote source and apply them via an API, or may enable the introduction of changes to metadata library 120 in any other manner.

Storage device 116 can comprise project metadata selection component 140, for selecting or configuring entities from database library 120 to create specific project metadata 128. It will be appreciated that project metadata selection component 140 can be used for initial selection and configuration of specific project metadata 128. Additionally, or alternatively, project metadata selection component 140 can be reactivated for changing the selection, for example selecting further entities from database library 120, deleting entities from specific project metadata 128, or the like.

Storage device 116 can comprise data item retrieval component 144, for retrieving one or more data items from one or more data sources in accordance with the queries defining data scope 236. The data items may be retrieved from a storage device associated with storage device 116, from an external storage device, from the Internet, or the like.

Storage device 116 can comprise execution component 148 for handling and analyzing the retrieved data items in accordance with the definitions in specific project metadata 128. The processing is detailed in accordance with FIG. 4 below.

Storage device 116 can comprise output component 152, for outputting the analysis results or intermediate results to a user. In particular, output component 152 can comprise visualization component 156 for providing a visual output of the results, such as graphs, tables, or the like. Output component 152 may be configured for providing the output in accordance with the output definitions as selected for output description 228 of specific project metadata 128 from metadata library 120.

Figure 3:
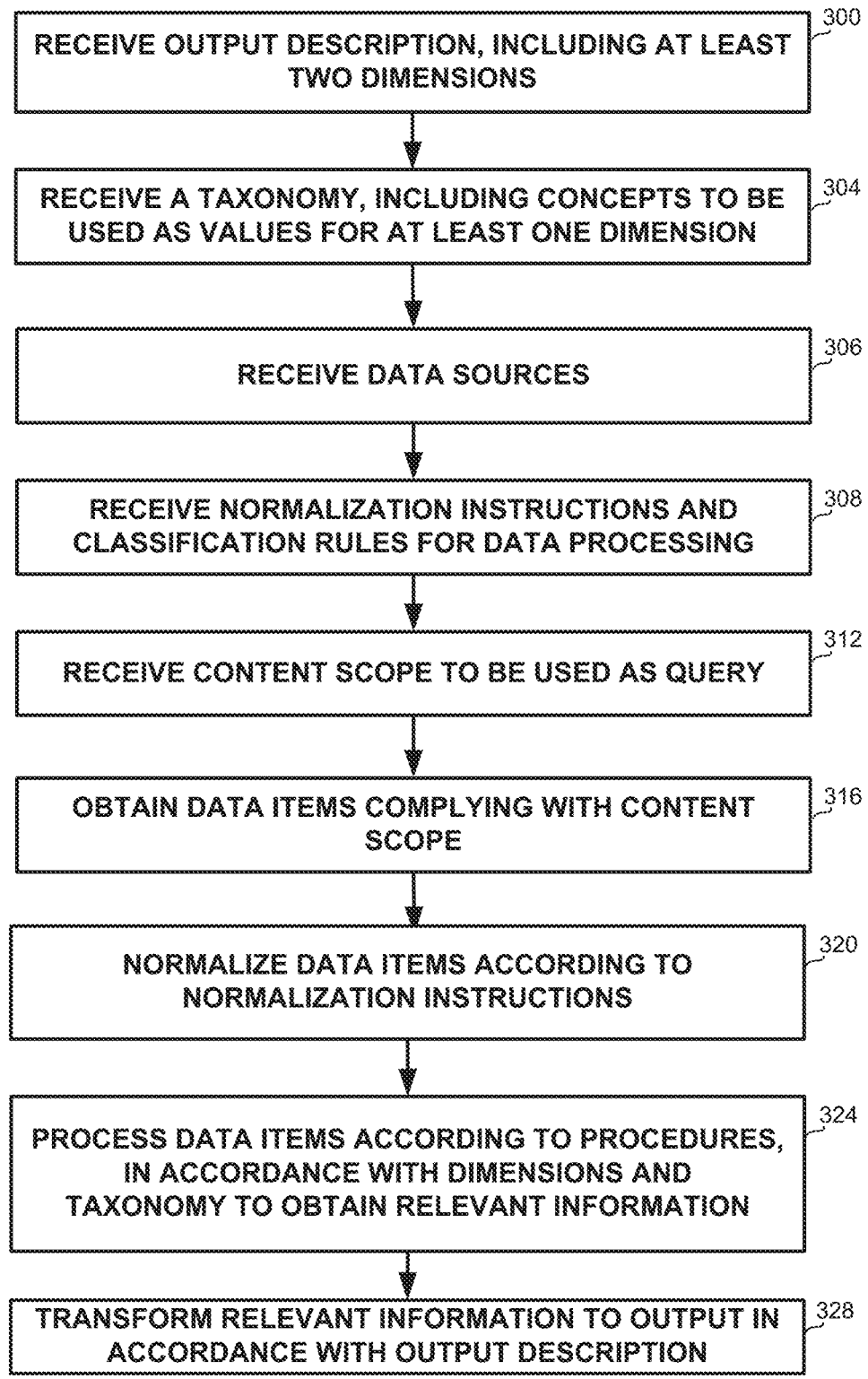
FIG. 3 is a flowchart of a method for extracting information from data, in accordance with some embodiments of the disclosure.

Referring now to FIG. 3, showing a flowchart of a method for extracting information from data, in accordance with some embodiments of the disclosure.

The method starts when a metadata library 120 is available, comprising all available meta data, and also specific project metadata library 128, comprising meta data relevant for a required project.

At step 300, output description, such as output description 228 may be received, including output type, at least one catalog, and at least two dimensions per catalog, to be used for displaying or otherwise demonstrating information. The output description may be received from specific project library metadata 128 which components are selected from metadata library 120.

At step 304, a taxonomy may be received, comprising one or more concepts such as words, terms or combinations of words and terms, wherein the concepts are to be used as values for at least one of two dimensions. The taxonomy may be received from the specific project library metadata 128, wherein the project specific collection of taxonomy concepts is selected from metadata library 120.

At step 306, one or more collection sources, and corresponding mapping and processing methods for such sources may be received, as selected by a user from specific project library metadata 128, which collection mappings and processing methods are received from the metadata library 120, following selection of such items.

At step 308, processing procedures, including normalization instructions per catalog in project, and classification rules per selected taxonomy may be received for processing data items of one or more sources. The classification rules and normalization instructions may be selected from project library metadata 128. A description of the mapping of source fields may also be received.

At step 312, content scope, in the form of free text, formatted query or any other format, which defines the specific list of entities, such as products, ingredients, patents or the like) to be analyzed in the project, may be configured for retrieval from each data source. Such set of scope configurations may define the content scope.

At step 316, data items may be retrieved from one or more data sources, such as one or more databases, one or more Internet sites accessed by searching or crawling, data provider APIs, or the like.

At step 320 the data items, after being mapped to a uniform representation, may be normalized in accordance with the normalization instructions obtained in step 308. Normalization may include removing duplicate items, removing irrelevant or excessively long items, or the like. Fields of the data items from the various sources may also be mapped, in order to generate a uniform representation of data items.

In step 324 the data items, in their uniform and normalized representation, may be further processed by applying classification rules as received in step 308, and/or performing other methods such as semantic search, in order to retrieve relevant information. The processing may be performed in accordance with the catalogs, dimensions, taxonomy as defined in the received output description, in order to obtain relevant information. The processing is detailed in association with FIG. 4 below.

In step 328 the relevant information may be transformed in accordance with the output description as received in step 300, to provide the final output for consumption.

It will be appreciated that step 316, 320, 324 and 328 may be performed repetitively, for example performed once, and repeated after a week, a month or another time period, to check the trends. When repeating steps 316, 320, 324 and 328, steps 300, 304, 306, 308 and 312 may be omitted or repeated in part of full, depending on the project needs at that time.

Figure 4:
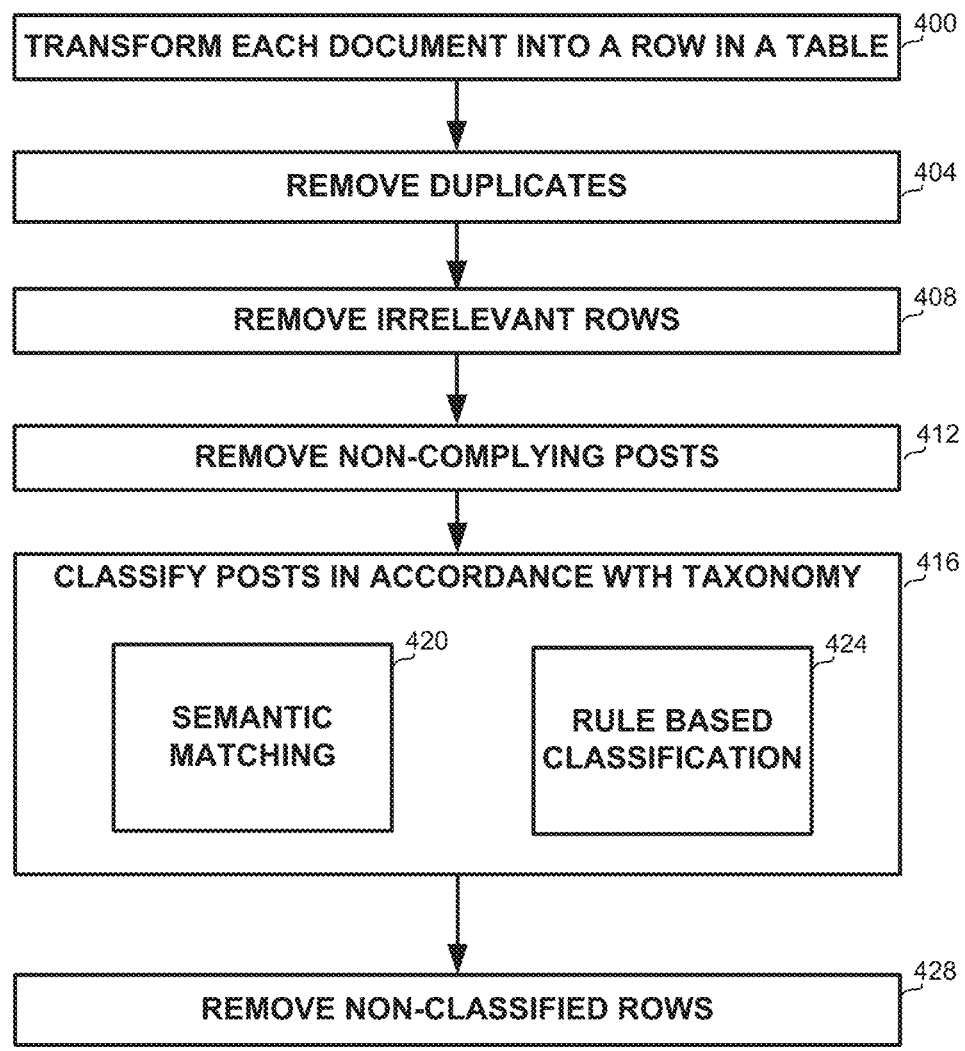
FIG. 4 is a flowchart of an exemplary method for processing data items which are posts of a social network, in accordance with some embodiments of the disclosure.

Referring now to FIG. 4, showing a flowchart of an exemplary method for processing data items which are posts of a social network, in accordance with some embodiments of the disclosure. FIG. 4 details steps 320 and 324 of FIG. 3, related to normalization and processing of data items.

The method of FIG. 4 is performed over each data item from the social network as retrieved in step 316 from a data source in accordance with the content scope. It will be appreciated that FIG. 4 is exemplary only in that it relates to data from social sources, and thus comprises specific processing in specific order. Processing data items from a different source which serves a catalog in the output definition may include steps which are identical or analogous to the steps of FIG. 4, as well as different processing steps or different order.

In step 400, using the field mapping received in step 308, each data item may be transformed into a uniform representation, by ensuring each relevant field of the data item is assigned the correct data type and inserted into the appropriate column of the unified representation. Transforming into the uniform representation may include specific rules. For example, a hashtag (#) in a product review may be ignored, while it may be meaningful in some social media sites, or the like In step 404, duplicate rows, i.e. rows related to identical items may be removed, if received more than once.

In step 408, irrelevant rows, for example rows not containing relevant taxonomy terms may be removed. It will be appreciated that such rows may contain terms defined in the query, but a more detailed classification process may be conducted whereby the text per row is scanned for additional taxonomy terms and any row which comes up empty after the "relevancy classification" is removed.

In step 412, rows representing other non-complying posts, such as data posts having a length below a first predetermined threshold or above a second predetermined threshold, may be removed, the removal pending other possible conditions, e.g. total number of posts.

In step 416 the posts may be processed, e.g. classified in accordance with the taxonomy. For example, each row may be classified to a class related to one or more concepts from the taxonomy, e.g., the lowest level in the taxonomy hierarchy. The classification may be performed using one or more methods. One such method is referred to as semantic matching 420, which may use preprocessing of the data items. The method is described for example, in U.S. patent application Ser. No. 16/051,531 filed Aug. 1, 2018, titled "Proposition Identification in Natural Language and Usage Thereof".

Another method may be rule based classification 424. The rules may be replicated from metadata library 120, such as other elements of the project. Additionally, or alternatively, the rules may be shared per category or any other context, like any other configuration element.

It will be appreciated that further methods may be employed as well.

It will be appreciated that each item may be classified by either method, arbitrarily or in accordance with some configuration. In some embodiments, one or more data items may be processed using multiple methods, wherein the final decision may be made by majority voting, giving precedence to one method over the other, or in any other manner.

In step 428, non-classified rows, which do not match any item in the taxonomy, may be removed.

It will be appreciated that the applicable classifications and processing may be performed sequentially, wherein a user may view and examine the results of each such processing step, and accept, reject or alter some or all the results prior to continuing with the next processing step. However, in other situations, for example in further repetitions, the steps may be performed in a continuous pipeline without user involvement.

Figure 5:
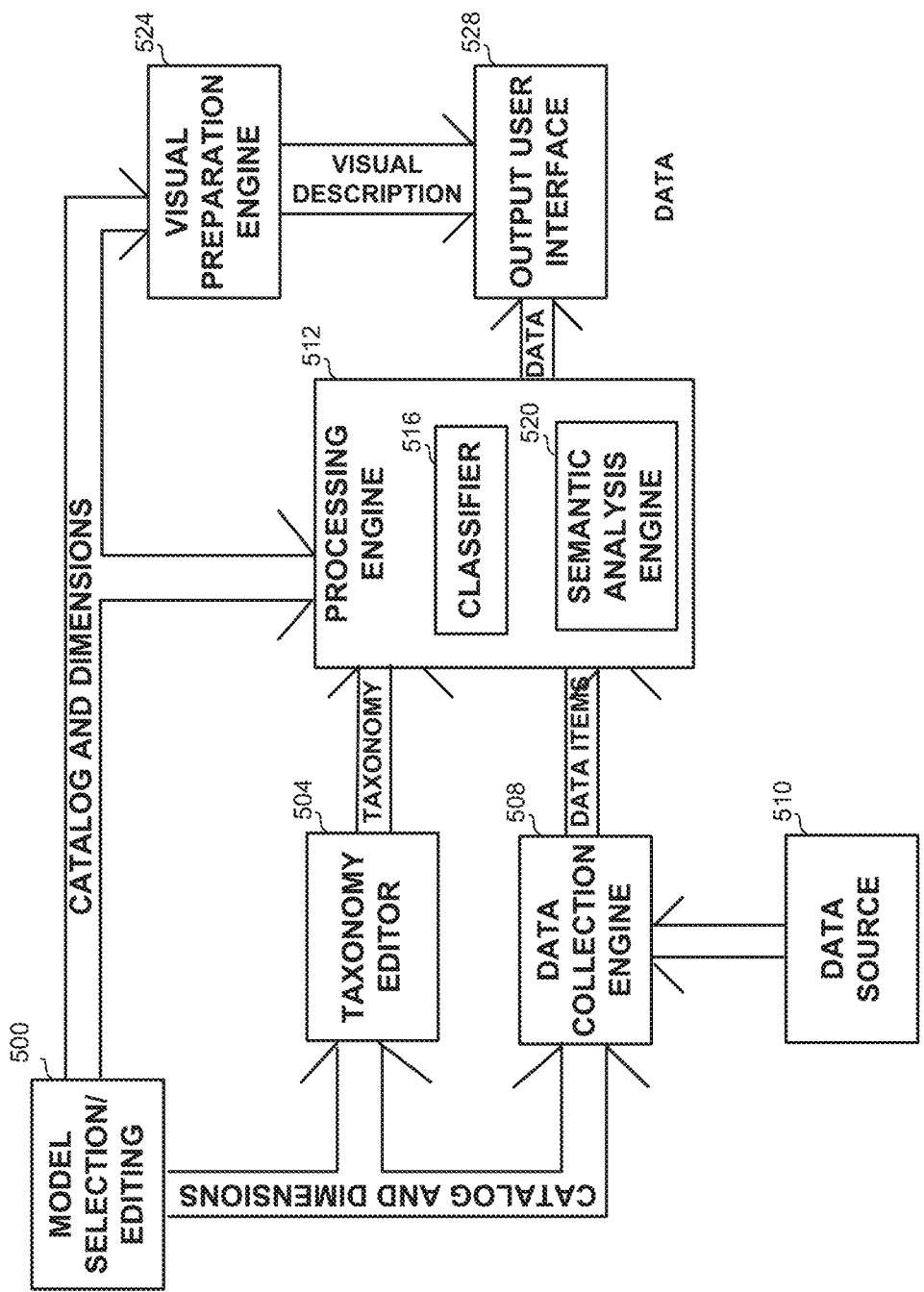
FIG. 5 is a block diagram of the main entities and the flow of control and data therebetween in an apparatus, in accordance with some embodiments of the disclosure.

Referring now to FIG. 5, showing a block diagram of the main entities in an apparatus in accordance with the disclosure, and the flow of control and data therebetween.

A user may use model selection or editing module 500 to edit or select one or more models from a library. Model editing and collection module 500 is further detailed in accordance with FIGS. 6-8 below. The output of selection or editing module 500 comprises a description of output, a catalog and relevant dimensions.

The catalog and dimensions may be provided to taxonomy editor 504, with which a user may add or edit a taxonomy related to the catalog. The taxonomy values serve as values or collection of values for a dimension. For example, day, week, month or year may be used for a time dimension. The taxonomy editor is further detailed in accordance with FIG. 11 below.

The catalog and dimensions may also be provided to data collection engine 508, which can retrieve data items from data source 510 identified as part of the model. The data items are retrieved in accordance with the catalog and dimensions.

The catalog and dimensions, as well as the taxonomy and the data items may also be provided to processing engine 512, which may comprise one or more classifiers 516 and one or more analysis engines, such as semantic analysis engine 520. The operation of processing engine 512 is detailed in association with the flowchart of FIG. 4 above.

The catalog and dimensions may also be provided to visual representation engine 524, for generating the visual representation, for example the graph structure in accordance with the dimensions and filters.

The data, as classified and processed by processing engine 512, and the visual representation produced in accordance with the model are provided to output user interface 528, for displaying the results to a user.

It will be appreciated that further options may be enabled in certain embodiments, for example displaying the data items prior to processing, adding a time stamp to each output such that further activations of the system for processing later available items may carry a different date.

Figure 6:
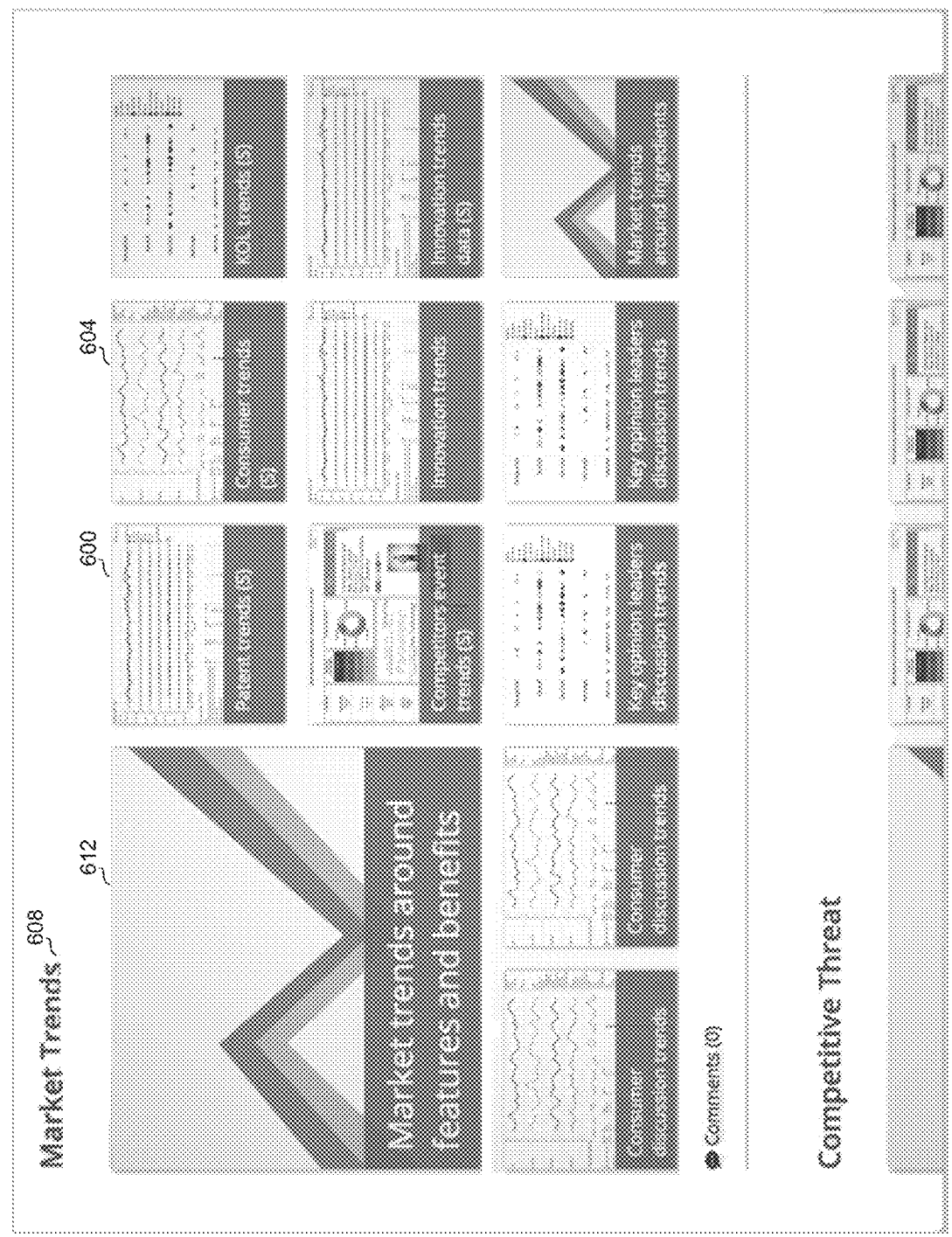
FIG. 6 is a display of an exemplary model library, in accordance with some embodiments of the disclosure.

Referring now to FIG. 6, showing a display of an exemplary model library, comprising multiple models, such as patent trends model 600, consumer trends model 604, or others, aggregated under market trends model collection 608. Each model is shown with a general description complying with an output definition. If no output is defined, a default display may be used, such as for market trends around ingredients 612.

Figure 7:
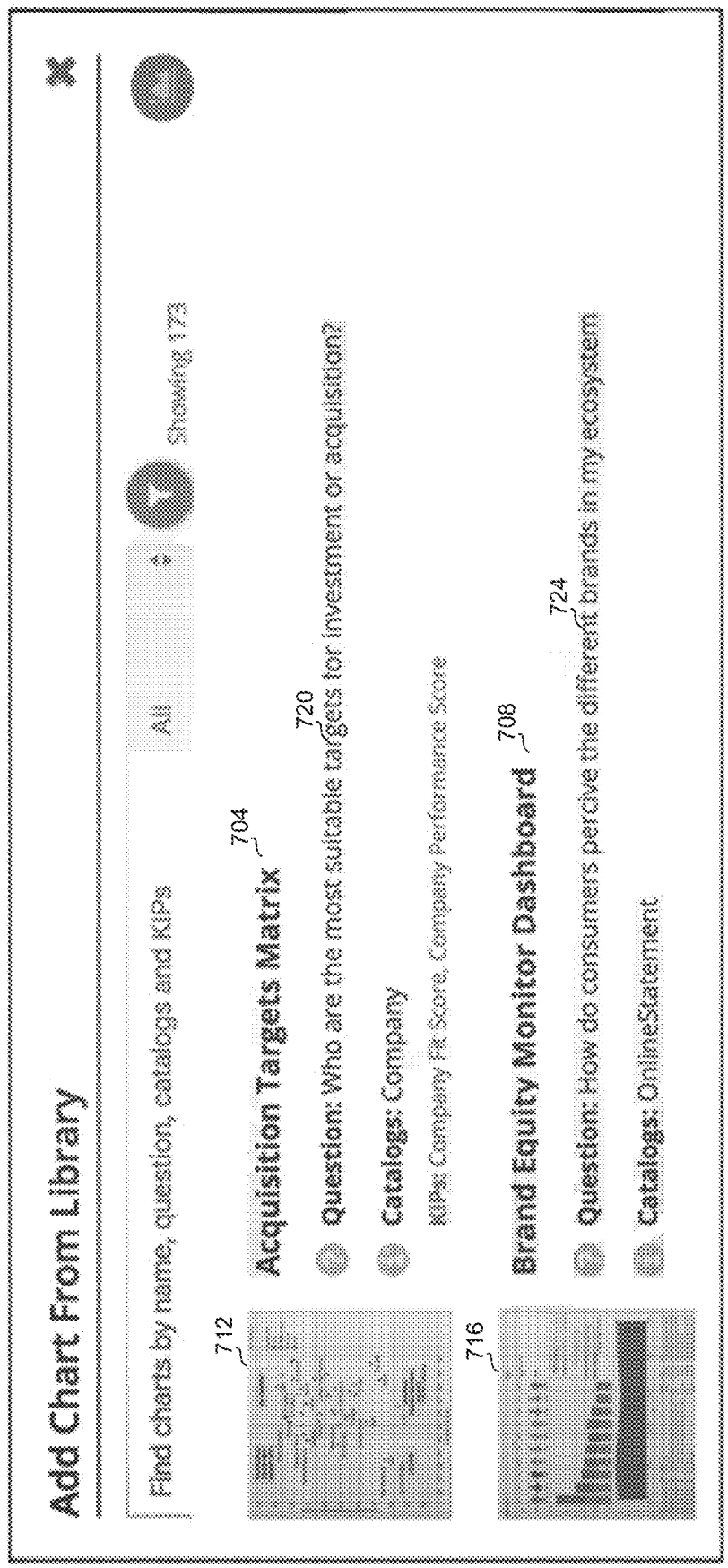
FIG. 7 is an exemplary detailed view of specific models, in accordance with some embodiments of the disclosure.

Referring now to FIG. 7, showing an exemplary detailed view of specific models 704, 708, which can be selected from the library. For each model there is shown a visual representation 712 and 716, respectively, the question which the output is aimed at answering 720 and 724, respectively, the relevant catalogs and the presented dimensions (referred to as KIP—Key Intelligence Parameter). The detailed views can be reached from the more general view shown on FIG. 6 above.

Figure 8:
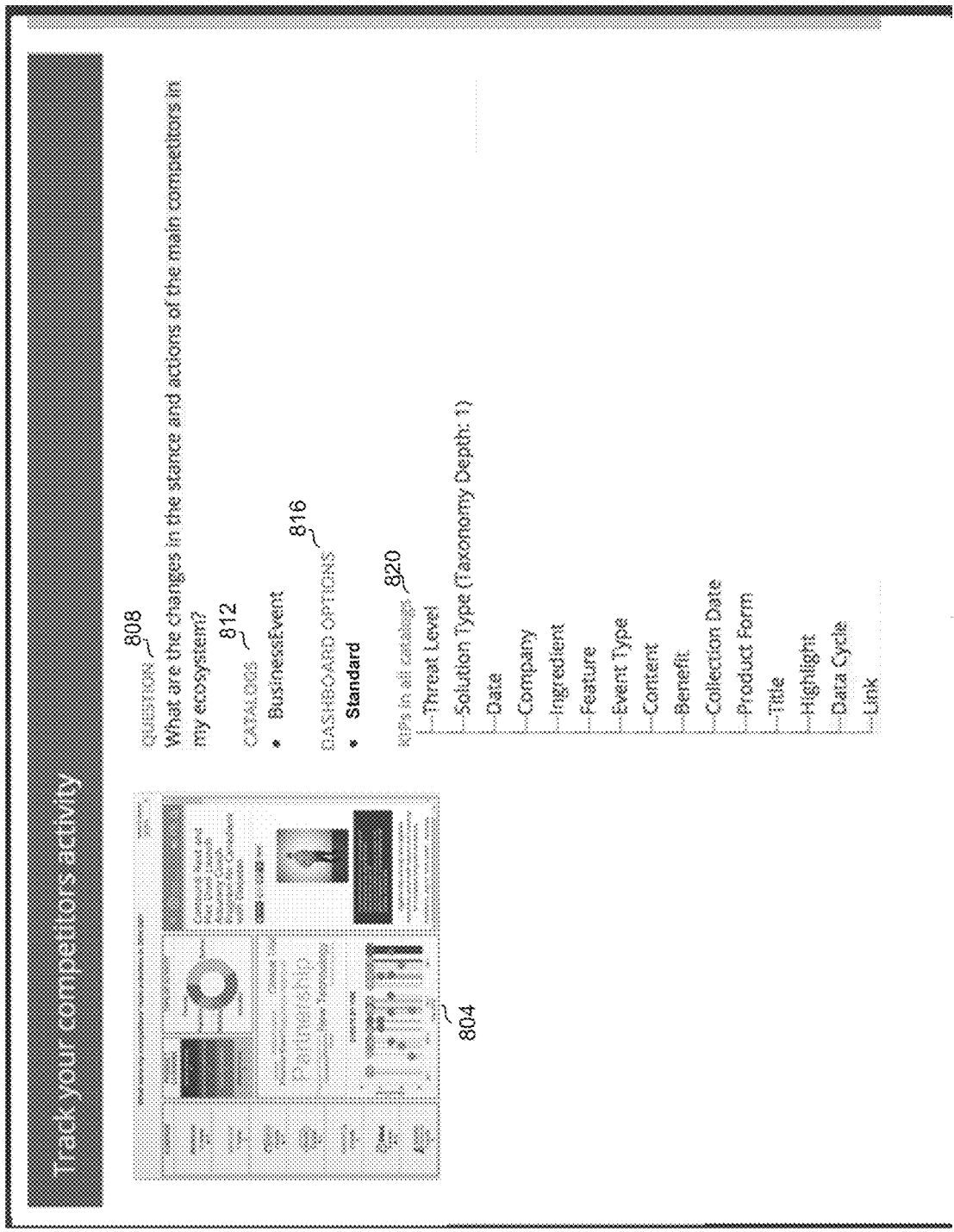
FIG. 8 is a further detailed view of a selected model, in accordance with some embodiments of the disclosure.

Referring now to FIG. 8, showing a further detailed view of a selected model. The view comprises graphic representation 804, the question to be answered 808, the relevant participating catalogs 812, dashboard options 816, and dimensions (KIPS) 820 contained in all catalogs.

Referring now to FIG. 9, showing an exemplary display of a summary of a project. The left column shows a list of all models included in the project. The models may be aggregated into groups, such as group 900 "Market Trends" which includes models "Patent Trends" 600 and "Consumer Trends" 604.

The right column shows the catalogs used in the project, and the dimensions associated with each catalog. For example, "Online Statement" catalog 908 comprises dimensions of Sales 912 and "Patent Strength" 916. The dimensions may be arranged hierarchically, for example "Patent Strength" dimension 916 may be a computed dimension which is calculated based on "Number of Citations" 920, "Family Size" 924, "Number of Geographies" 928 and "Number of Claims" 932.

Figure 10:
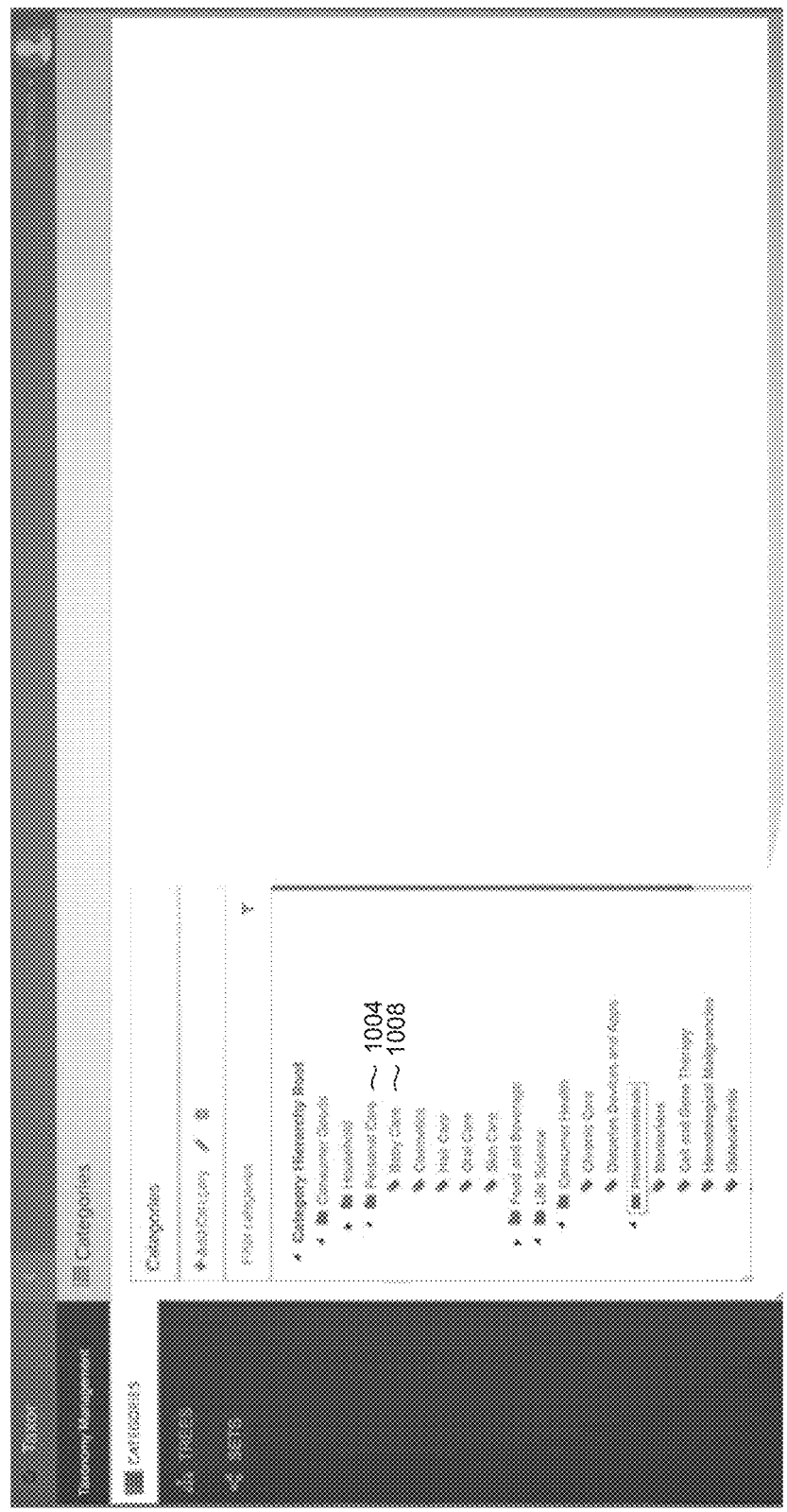
FIG. 10 is an exemplary user interface for category management, in accordance with some embodiments of the disclosure.

Referring now to FIG. 10, showing an exemplary user interface for category management. The categories may be arranged hierarchically, wherein categories may be leaves or internal nodes. Each node, representing a category, may be associated with one or more lower level categories, or subcategories. For example, "Personal Care" category 1004 is associated with "Baby Care" subcategory 1008 and additional subcategories. Using the user interface, categories can be added, changed, deleted, or the like.

Figure 11:
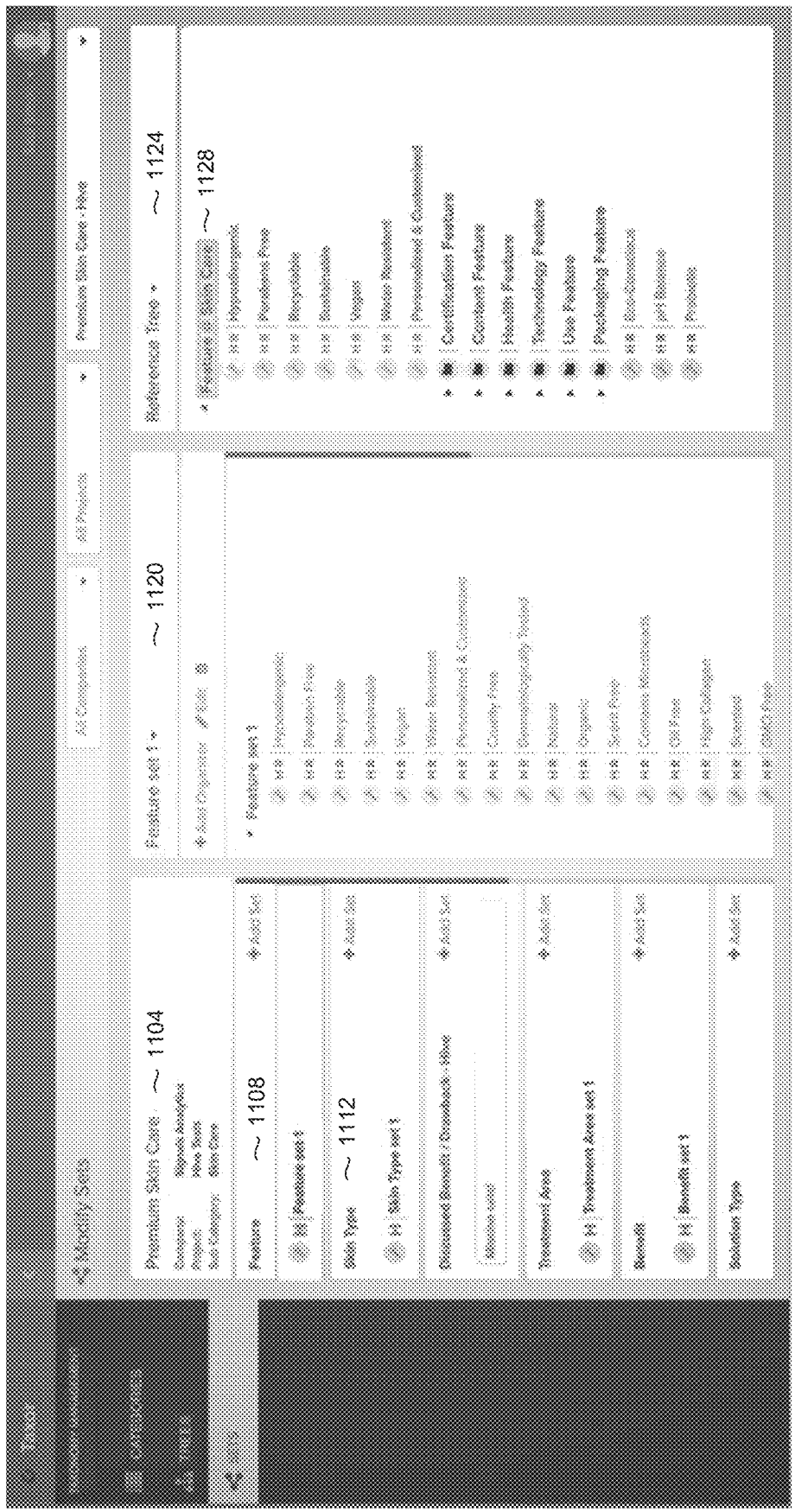
FIG. 11 is an exemplary user interface for editing taxonomies within the context of a project, in accordance with some embodiments of the disclosure.

Referring now to FIG. 11, showing an exemplary user interface for editing taxonomies within the context of a project.

In the example of FIG. 11, Premium Skin Care project 1104 is active. The user interface lists for the project all relevant dimensions, such as "Feature" 1108 or "Skin Type" 1112.

The central part 1120 of the user interface lists for the selected dimension, being "Feature" dimension 1108 in this case, the relevant taxonomy terms selected from the "Reference Tree" 1124.

The right-hand "Reference Tree" part 1124 of the user interface lists all terms for "Feature" dimension, selected for the project from category taxonomy of "Feature" dimension, defined as "Feature @ Skin Care" 1128. It will be appreciated that a dimension in a project may be associated with a multiplicity of taxonomy sets, since each such set may be used within the output of a different model in the project.

Figure 12:
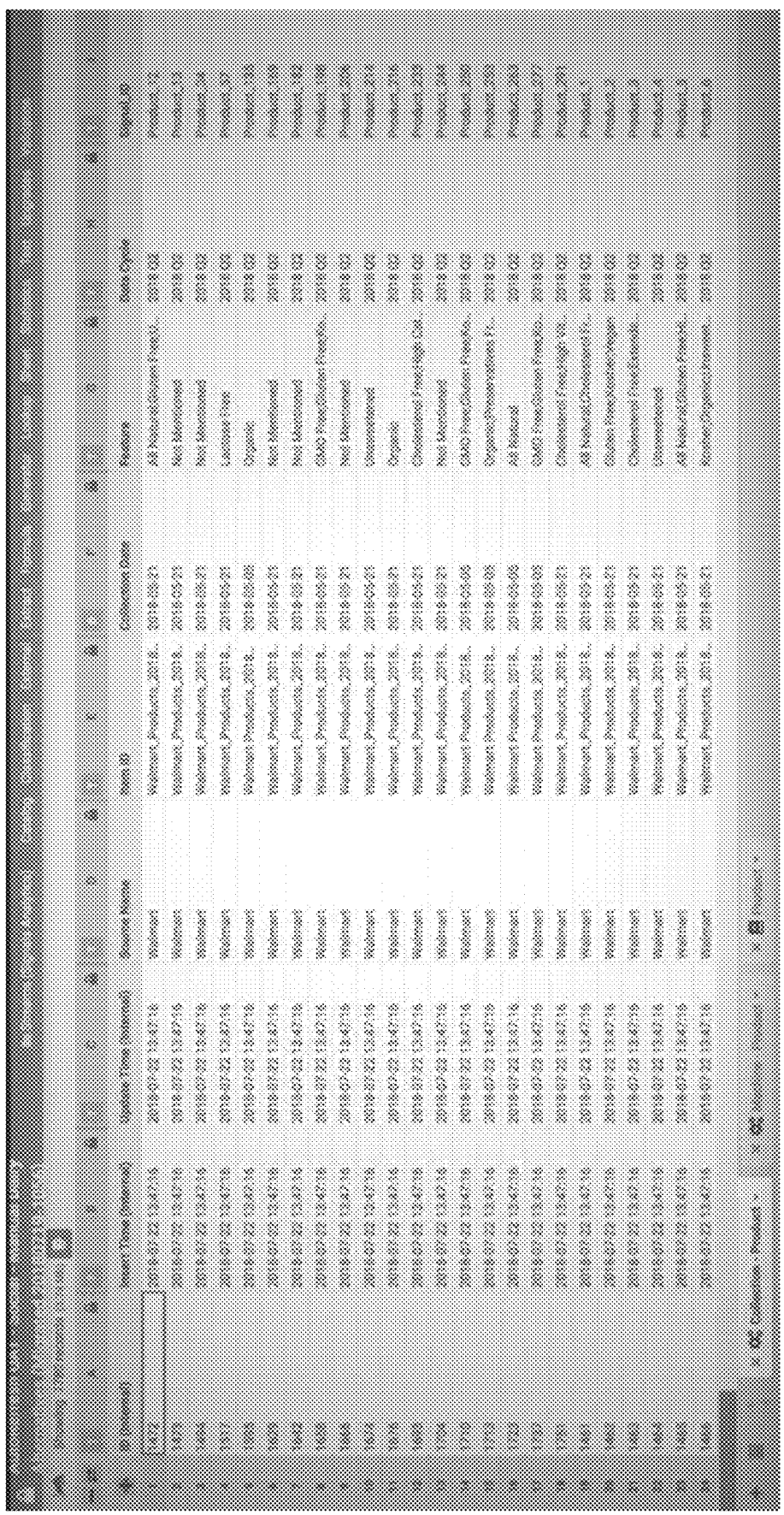
FIG. 12 is an exemplary user interface for displaying the collected items to a user, in accordance with some embodiments of the disclosure.

Referring now to FIG. 12, showing an exemplary user interface for displaying the collected items to a user. Each item is displayed in a row, wherein some of the item attributes correspond to the table columns. The user can view the results, and change any of the definitions related to the project models, categories, dimensions, data sources, processing instructions, or others, and the corresponding changes will be reflected in the structure and received content of grid user interface. Once the retrieved data items are satisfactorily inserted into the grid, the processing and normalizing instructions as received on step 308 are invoked.

Figure 13A:
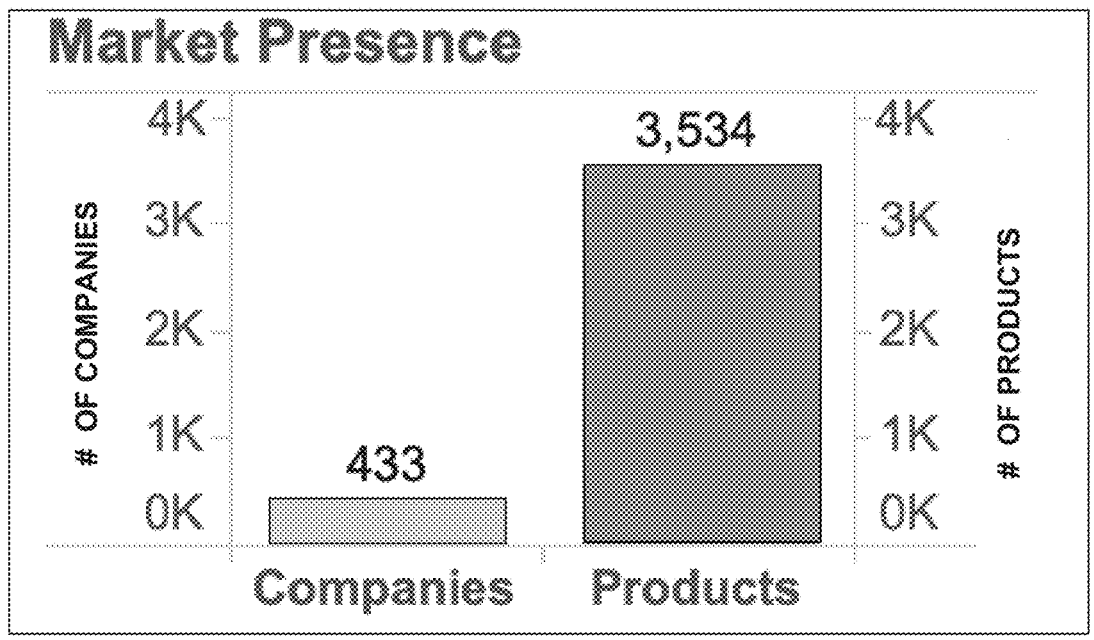
FIGS. 13A-13C are exemplary output graphs, in accordance with some embodiments of the disclosure.
Figure 13B:
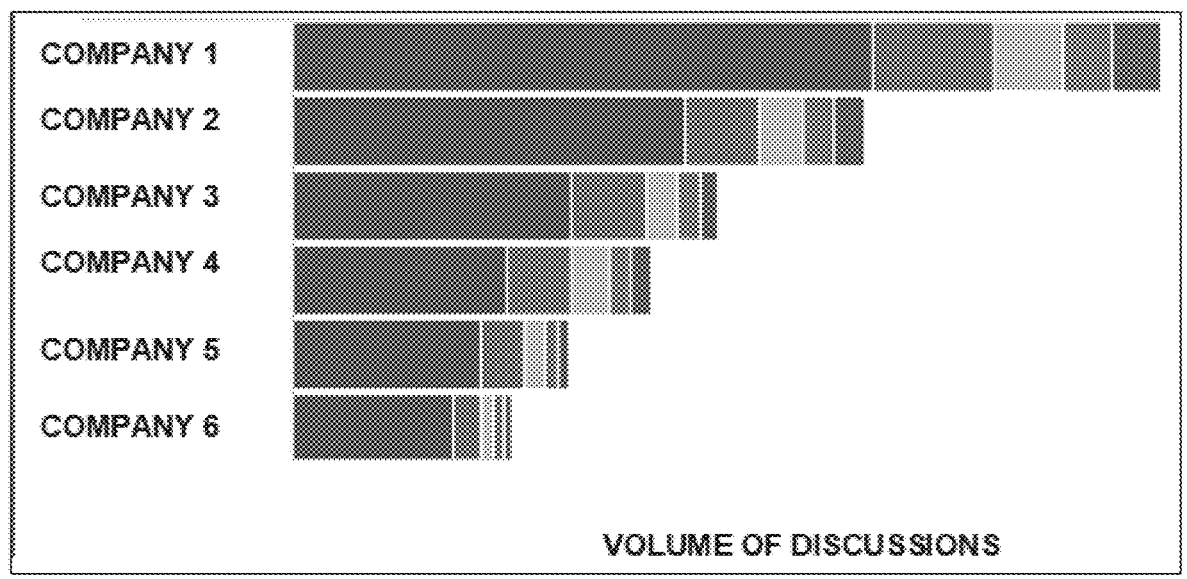
Figure 13C:
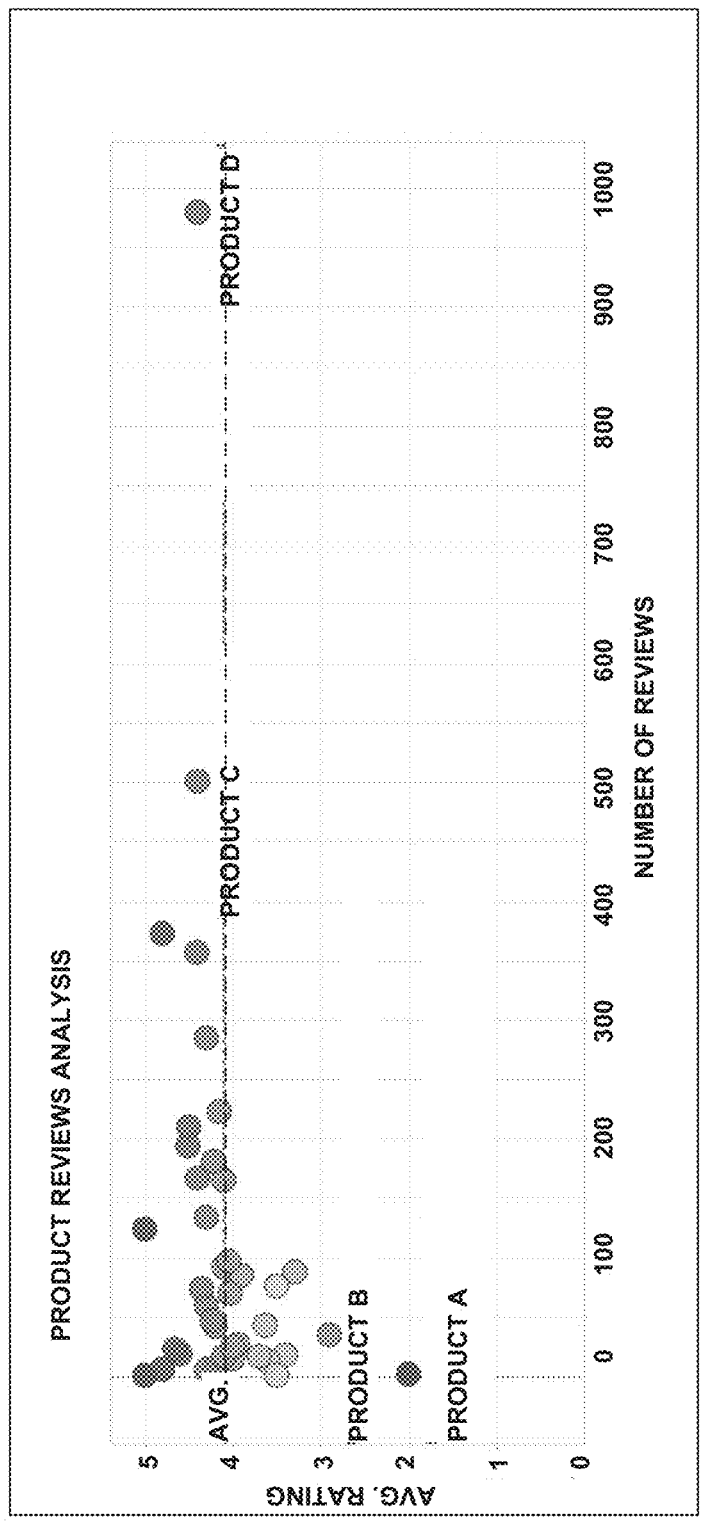

Referring now to FIGS. 13A-13C, showing exemplary output graphs.

FIG. 13A shows a graph representing the presence of a particular product in the market, e.g. the number of variants or alternative products, and the number of companies producing these variants and alternatives, on the same graph. Thus, the left column represents the number of companies, while the right column represents the number of products.

FIG. 13B shows a graph representing social analysis of a number of products. The total length of each bar represents the number of reviews related to the product, while the shades represent the sentiment of the reviews, Thus, darker shades on the left represent highly positive sentiment, i.e. positive reviews, lighter shades on the left represent lower positive sentiment, intermediate shades represent neutral reviews, lighter shades on the right represent lower negative sentiment and darker shades on the right represent highly negative sentiment.

FIG. 13C shows a graph representing product review analysis, in which each circle represents one product. The identity and details of any product can be displayed, for example in response to a mouse click event on the circle corresponding to the product of interest. The X coordinate of the location of each circle represents the number of reviews collected for the product, while the Y coordinate represents the average sentiment, or "Average Rating", expressed in the product reviews, such that a higher Y value represents more positive sentiment. The color code of each circle may correspond to the product's average rating. Other controls (not shown) may enable a user to filter the products displayed on the graph.

The flow diagram of FIG. 5 and the exemplary screenshots shown in FIGS. 6-13C demonstrate the "production line" manner of the disclosed apparatus and method, in which data is collected and processed, wherein the process can be stopped and resumed with newly collected data items. The Figures also demonstrated that the definitions provided from the user, including the catalogs and dimensions are used all over the system: in editing the taxonomy, collecting the items, analyzing the items, preparing the visual elements of the display and outputting the results.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, Java, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for obtaining information from data, executed by a computing platform comprising a memory and a processor,
the method comprising:
receiving a description of at least one output for obtained information, the description including type for the output and at least two dimensions associated with the at least one output, the description selected from a metadata library;

receiving a taxonomy, including concepts to be searched for within data, wherein at least one of the concepts constitutes a value for at least one dimension from the at least two dimensions, the taxonomy selected from the metadata library;

receiving processing procedures for data processing;

receiving an indication of at least one data source;

receiving content scope, associated with the data source or the taxonomy;

obtaining unstructured data items from the at least one data source complying with the content scope;

normalizing the unstructured data items in accordance with normalization instructions related to each of the at least one data source, said normalizing comprising removing duplicate data items and irrelevant data items;

processing by the processor the unstructured data items according to the processing procedures, said processing including classifying the unstructured data items by applying processing instructions for identifying sentences that include variations of words or phrases from the taxonomy, said processing performed in accordance with the description of the at least one output, thereby obtaining a subset of relevant data items from the data items, and obtaining relevant information from the relevant data items;

transforming by the processor the relevant information into output, in accordance with the description of the at least one output; and repeating said obtaining, said normalizing, said processing and said transforming after a predetermined period of time for assessing a trend, while refraining from repeating said receiving steps.

2. The method of claim 1, further comprising receiving a definition of how to obtain the information from data in context of output presentation, including access instructions to the at least one data source and mapping of source fields to the at least two dimensions.

3. The method of claim 1, wherein the description comprises associations between each of the at least two dimensions and a respective role.

4. The method of claim 3, wherein the role is an axis of a graph or a filter.

5. The method of claim 1, wherein the description and the taxonomy are associated with any arbitrary domain.

6. The method of claim 1, wherein at least part of the metadata library is partitioned by domains.

7. The method of claim 1, wherein the metadata library is created or modified by configuring.

8. The method of claim 1, wherein the description, the taxonomy and the processing procedures are selected by configuration.

9. The method of claim 1, wherein said processing and said transforming do not require a user to program any additional code for processing for a particular domain.

10. The method of claim 1, wherein the at least one data comprises at least two data sources.

11. The method of claim 1, wherein said processing comprises semantic analysis of the unstructured data items.

12. The method of claim 1, wherein the at least one data source comprises patent documents.

13. A computerized apparatus having a processor, the processor configured to perform the steps of:

receiving a description of at least one output for obtained information, the description including type for the output and at least two dimensions associated with the at least one output, the description selected from a metadata library;

receiving a taxonomy, including concepts to be searched for within data, wherein at least one of the concepts constitutes a value for at least one dimension from the at least two dimensions, the taxonomy selected from the metadata library;

receiving processing procedures for data processing;

receiving an indication of at least one data source;

receiving content scope, associated with the at least one data source or the taxonomy;

obtaining unstructured data items from the at least one data source complying with the content scope;

normalizing the unstructured data items in accordance with normalization instructions related to each of the at least one data source, said normalizing comprising removing duplicate data items and irrelevant data items;

processing by the processor the unstructured data items according to the processing procedures, said processing classifying the unstructured data items by applying processing instructions for identifying sentences that include variations of words or phrases from the taxonomy, said processing performed in accordance with the description of the at least one output and in accordance with the taxonomy, thereby obtaining a subset of relevant data items from the relevant data items, and obtaining relevant information from the data items; and transforming by the processor the relevant information into output, in accordance with the description of the at least one output; and repeating said obtaining, said normalizing, said processing and said transforming after a predetermined period of time for assessing a trend, while refraining from repeating said receiving steps.

14. The apparatus of claim 13, wherein the processor is further configured to perform receiving a definition of how to obtain the information from data in context of output presentation, including access instructions to at least one data source and mapping of source fields to the at least two dimensions.

15. The apparatus of claim 13, wherein the description comprises associations between each of the at least two dimensions and a respective role.

16. The apparatus of claim 13, wherein the description and the taxonomy are associated with any arbitrary domain.

17. The apparatus of claim 13, wherein at least part of the metadata library is partitioned by domains.

18. The apparatus of claim 13, wherein the metadata library is created or modified by configuring.

19. The apparatus of claim 13, wherein the description, the taxonomy and the processing procedures are selected by configuration.

20. The apparatus of claim 13, wherein said processing and said transforming do not require a user to program any additional code for processing for a particular domain.

21. The apparatus of claim 13, wherein the at least one data comprises at least two data sources.

22. The apparatus of claim 13, wherein said processing comprises semantic analysis of the unstructured data items.

23. The apparatus of claim 13, wherein the at least one data source comprises patent documents.

24. A computer program product comprising a non-transitory computer readable storage medium retaining program instructions configured to cause a processor to perform actions, which program instructions implement:
  receiving a description of at least one output for obtained information, the description including type for the output and at least two dimensions associated with the at least one output, the description selected from a metadata library;
  receiving a taxonomy, including concepts to be searched for within data, wherein at least one of the concepts constitutes a value for at least one dimension from the at least two dimensions, the taxonomy selected from the metadata library;
  receiving processing procedures for data processing;
  receiving an indication of at least one data source;
  receiving content scope, associated with the at least one data source or the taxonomy;
  obtaining unstructured data items from the at least one data source complying with the content scope;
  normalizing the unstructured data items in accordance with normalization instructions related to each of the at least one data source, said normalizing comprising removing duplicate data items and irrelevant data items;
  processing by the processor the unstructured data items according to the processing procedures, said processing including classifying the unstructured data items by applying processing instructions for identifying sentences that include variations of words or phrases from the taxonomy,
    said processing performed in accordance with the description of the at least one output and in accordance with the taxonomy, thereby obtaining a subset of relevant data items from the data items, and obtaining relevant information from the relevant data items; and
  transforming by the processor the relevant information into output, in accordance with the description of the at least one output.

* * * * *